United States Patent
Schmidt et al.

(10) Patent No.: US 12,164,220 B2
(45) Date of Patent: *Dec. 10, 2024

(54) FABRIC DROP-DOWN DIFFUSERS

(71) Applicant: Rite-Hite Holding Corporation, Milwaukee, WI (US)

(72) Inventors: Blaine Schmidt, Peosta, IA (US); Kevin J. Gebke, Dubuque, IA (US); Michael A. Jacobson, Dubuque, IA (US); Nicholas L. Kaufmann, Sherrill, IA (US); William A. Niehaus, Holy Cross, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 182 days.

This patent is subject to a terminal disclaimer.

(21) Appl. No.: 17/582,934

(22) Filed: Jan. 24, 2022

(65) Prior Publication Data
US 2022/0146141 A1   May 12, 2022

Related U.S. Application Data

(63) Continuation of application No. 15/417,006, filed on Jan. 26, 2017, now Pat. No. 11,231,202.

(51) Int. Cl.
*F24F 13/06* (2006.01)
*F24F 13/02* (2006.01)
(Continued)

(52) U.S. Cl.
CPC .......... *G03B 29/00* (2013.01); *F24F 13/0218* (2013.01); *F24F 13/06* (2013.01);
(Continued)

(58) Field of Classification Search
CPC ...... F24F 13/06; F24F 13/062; F24F 13/0218; F24F 2013/0608; F24F 2221/14; F24F 13/082; E04B 2009/0492
(Continued)

(56) References Cited

U.S. PATENT DOCUMENTS

| | | | |
|---|---|---|---|
| 3,084,609 A * | 4/1963 | Onstad | F24F 8/108 55/498 |
| 4,009,647 A | 3/1977 | Howorth | |

(Continued)

FOREIGN PATENT DOCUMENTS

| | | |
|---|---|---|
| CN | 101960201 | 1/2011 |
| CN | 103958981 | 7/2014 |

(Continued)

OTHER PUBLICATIONS

Mexican Institute of Industrial Property, "Non-Final Office Action," issued in connection with MX Application No. MX/a/2019/008884, issued on Apr. 28, 2023, 10 pages. (With Machine Translation).

(Continued)

*Primary Examiner* — Michael G Hoang
*Assistant Examiner* — Ryan L Faulkner
(74) *Attorney, Agent, or Firm* — Hanley, Flight & Zimmerman, LLC

(57) ABSTRACT

Fabric drop-down diffusers are disclosed. An example drop-down diffuser includes a hoop to be supported adjacent an end of an air duct, and a first fabric sheet to hang downward from the hoop. The first fabric sheet to define a first wall of an air chamber adjacent the hoop on a side of the hoop opposite the air duct. The first fabric sheet to completely surround the air chamber along a circumferential path corresponding to the hoop. The hoop to be transverse to the air duct and positioned so that air delivered by the air duct is to pass through the hoop and into the air chamber. The drop-down diffuser also includes a second fabric sheet to be coupled to the first fabric sheet. The second fabric sheet to define a second wall of the air chamber.

20 Claims, 10 Drawing Sheets

(51) Int. Cl.
  *F24F 13/062*   (2006.01)
  *G03B 21/14*    (2006.01)
  *G03B 21/16*    (2006.01)
  *G03B 21/54*    (2006.01)
  *G03B 29/00*    (2021.01)
  *G03B 31/00*    (2021.01)

(52) U.S. Cl.
  CPC .......... *F24F 13/062* (2013.01); *G03B 21/145* (2013.01); *G03B 21/16* (2013.01); *G03B 21/54* (2013.01); *G03B 31/00* (2013.01); *F24F 2013/0608* (2013.01); *F24F 2221/14* (2013.01)

(58) Field of Classification Search
  USPC ........................................................ 454/296
  See application file for complete search history.

(56) References Cited

U.S. PATENT DOCUMENTS

| | | | |
|---|---|---|---|
| 4,890,544 | A | 1/1990 | Aalto et al. |
| 5,490,813 | A * | 2/1996 | Danielsen ............. F24F 13/068 |
| | | | 454/306 |
| 5,655,963 | A | 8/1997 | Paschke et al. |
| 5,735,738 | A | 4/1998 | Kuno et al. |
| 5,782,689 | A | 7/1998 | Woolsey et al. |
| 6,558,250 | B1 | 5/2003 | Paschke |
| 8,434,526 | B1 | 5/2013 | Pinkalla et al. |
| 8,844,578 | B2 | 9/2014 | Pinkalla et al. |
| 9,152,191 | B1 | 10/2015 | Gardner |
| 9,605,864 | B2 | 3/2017 | Pinkalla et al. |
| 9,605,865 | B2 | 3/2017 | Pinkalla et al. |
| 9,612,033 | B2 | 4/2017 | Pinkalla et al. |
| 11,231,202 | B2 | 1/2022 | Schmidt et al. |
| 11,293,663 | B2 | 4/2022 | Schmidt et al. |
| 2002/0155805 | A1 | 10/2002 | Paschke |
| 2003/0022617 | A1 | 1/2003 | Gebke et al. |
| 2004/0102153 | A1 | 5/2004 | Gebke |
| 2008/0176506 | A1 | 7/2008 | Gebke et al. |
| 2009/0221226 | A1 | 9/2009 | Gebke et al. |
| 2011/0269390 | A1 | 11/2011 | Pinkalla et al. |
| 2012/0052792 | A1 | 3/2012 | Sinur et al. |
| 2015/0204574 | A1 | 7/2015 | Mustakallio et al. |
| 2016/0341443 | A1 | 11/2016 | Ramos et al. |
| 2018/0058714 | A1 | 3/2018 | Prihoda et al. |
| 2018/0209685 | A1 | 7/2018 | Schmidt et al. |
| 2022/0146141 | A1 | 5/2022 | Schmidt et al. |

FOREIGN PATENT DOCUMENTS

| | | |
|---|---|---|
| CN | 204153934 | 2/2015 |
| DE | 102010026459 | 1/2012 |
| EP | 2578957 | 10/2013 |
| EP | 2896905 | 7/2015 |
| FR | 2713317 | 6/1995 |
| GB | 2120778 | 12/1983 |
| JP | 62105449 | 7/1987 |
| JP | H01266462 | 10/1989 |
| JP | 2006349271 | 12/2006 |
| JP | 2012184867 | 9/2012 |
| JP | 2013002675 | 1/2013 |
| KR | 101425867 | 8/2014 |
| SE | 523459 | 4/2004 |
| WO | 2016141901 | 9/2016 |
| WO | 2016187291 | 11/2016 |
| WO | 2018140317 | 8/2018 |

OTHER PUBLICATIONS

Canadian Intellectual Property Office, "Examiner Requisition," issued in connection with Canadian Patent Application No. 3,160,416, issued on Aug. 28, 2023, 4 pages.

Mexican Institute of Industrial Property, "First Office Action," issued in connection with MX Application No. MX/a/2019/008884, issued on Jan. 12, 2023, 8 pages. (With Machine Translation).

European Patent Office, "Communication pursuant to Article 94(3) EPC" issued in connection with European Patent Application No. 18713398.8, issued on Feb. 6, 2023, 4 pages.

Mexican Institute of Industrial Property, "Office Action," issued in connection with Mexican Patent Application No. MX/a/2019/008884, issued on Nov. 19, 2023, 10 pages. Machine translation included.

United States Patent and Trademark Office, "Restriction Requirement," issued in connection with U.S. Appl. No. 16/186,283, issued on Sep. 25, 2020, 7 pages.

Patent Cooperation Treaty, "International Preliminary Report on Patentability," issued in connection with appl. No. PCT/US2018/014424, issued on Jul. 30, 2019, 8 pages.

Industrial Property Cooperation Center, "Search Report by Registered Search Organization," issued in connection with Japanese Patent Application No. 2019-538646, issued on Aug. 5, 2020, 10 Pages.

International Searching Authority, "International Search Report and Written Opinion," issued in connection with PCT Application No. PCT/US2018/014424, issued on Jun. 18, 2018, 11 pages.

United States Patent and Trademark Office, "Advisory Action," issued in connection with U.S. Appl. No. 15/417,006, issued on Feb. 16, 2021, 3 pages.

Australian Government, "Notice of Acceptance for Patent Application," issued in connection with Australian Patent Application No. 2018212451 Issued on Jul. 10, 2020, 3 pages.

European Patent Office, "Communication Pursuant to Article 94(3) EPC," issued in connection with European patent application No. 18713398.8, issued on Dec. 22, 2020, 4 pages.

Chinese Patent Office, "First Office Action," issued in connection with Chinese Patent Application No. 201880007321.0, issued on Jul. 2, 2020, 30 pages. (English Translation Included).

Chinese Patent Office, "Second Office Action," issued in connection with Chinese Patent Application No. 201880007321.0, issued on Feb. 3, 2021, 23 pages. (English Translation Included).

Japanese Patent Office, "Notice of Allowance," issued in connection with Japanese Patent Application No. 2019-538646, issued on Apr. 6, 2021, 3 pages.

Canadian Intellectual Property Office, "Office Action," issued in connection with Canadian patent application No. 3,050,905, issued on Dec. 21, 2020, 4 pages.

Indian Patent Office "Examination Report," issued on connection with Indian Patent application No. 201917029494, issued on Nov. 27, 2020, 6 pages.

International Searching Authority, "International Search Report and Written Opinion," issued in connection with PCT Application No. PCT/US2019/059673, issued on May 11, 2021, 6 pages.

European Patent Office, "Communication Pursuant to Rule 114(2) EPC," issued in connection with European patent application No. 18713398.8, issued on Jun. 8, 2020, 25 pages.

The China National Intellectual Property Administration, "Notice of Completing Formalities for Patent Registration," issued in connection with Chinese patent application No. 201880007321.0 issued on Jul. 13, 2021, 8 pages.

Prihoda, "Air Diffuser Lantern," Apr. 15, 2016, 1 page.

Prihoda sro, "Fabric ducting Lantern with membrane prihoda," Screenshots from Youtube video, <https://www.youtube.com/watch?v=T58xRuZIrSM>, Nov. 30, 2015, 3 pages.

United States Patent and Trademark Office, "Notice of Allowance and Fee(s) Due," issued in connection with U.S. Appl. No. 15/417,006, issued on Sep. 15, 2021, 8 pages.

Prihoda, "Tailor-made Air Ducting & Diffusers Air Diffuser Lantern," Apr. 15, 2016, 2 page.

Canadian Intellectual Property Office, "Office Action," issued in connection with Canadian patent application No. 3,050,905, issued on May 28, 2021, 4 pages.

United States Patent and Trademark Office, "Final Office Action," issued in connection with U.S. Appl. No. 15/417,006, issued on Oct. 7, 2020, 18 pages.

(56) References Cited

OTHER PUBLICATIONS

Japanese Patent Office, "Notice of Reasons for Rejection," issued in connection with Japanese patent application No. 2019-538646, on Aug. 28, 2020, 8 pages.

United States Patent and Trademark Office, "Election/Restrictions," issued in connection with U.S. Appl. No. 15/417,006, issued on Oct. 25, 2019, 8 pages.

United States Patent and Trademark Office, "Non Final Office Action," issued in connection with U.S. Appl. No. 15/417,006, issued on Feb. 20, 2020, 34 pages.

International Searching Authority, "International Search Report and Written Opinion," issued in connection with PCT Application No. PCT/US2019/059673, issued on Mar. 26, 2020, 7 pages.

Australian Government, "Examination report No. 1," issued in connection with Australian Patent Application No. 2018212451 Issued on Dec. 6, 2019, 3 pages.

United States Patent and Trademark Office, "Non Final Office Action," issued in connection with U.S. Appl. No. 16/186,283, issued on Apr. 27, 2021, 49 pages.

United States Patent and Trademark Office, "Notice of Allowance," issued in connection with U.S. Appl. No. 16/186,283, issued on Nov. 18, 2021, 15 pages.

United States Patent and Trademark Office, "Corrected Notice of Allowability," issued in connection with U.S. Appl. No. 16/186,283, issued on Jan. 12, 2022, 2 pages.

United States Patent and Trademark Office, "Corrected Notice of Allowability," issued in connection with U.S. Appl. No. 16/186,283, issued on Nov. 24, 2021, 2 pages.

Canadian Patent Office, "Notice of Allowance," issued in connection with Canadian patent application No. 3,050,905, issued on Jan. 13, 2022, 1 page.

Indian Patent Office, "Hearing Notice," issued in connection with Indian Patent Application No. 201917029494, issued on Oct. 27, 2023, 3 pages.

Mexican Intellectual Patent Office, "Notice of Allowance," issued in connection with Mexican Patent Application No. MX/a/2019/008884, dated Apr. 25, 2024, 6 pages [machine English translation included].

* cited by examiner

FIG. 1
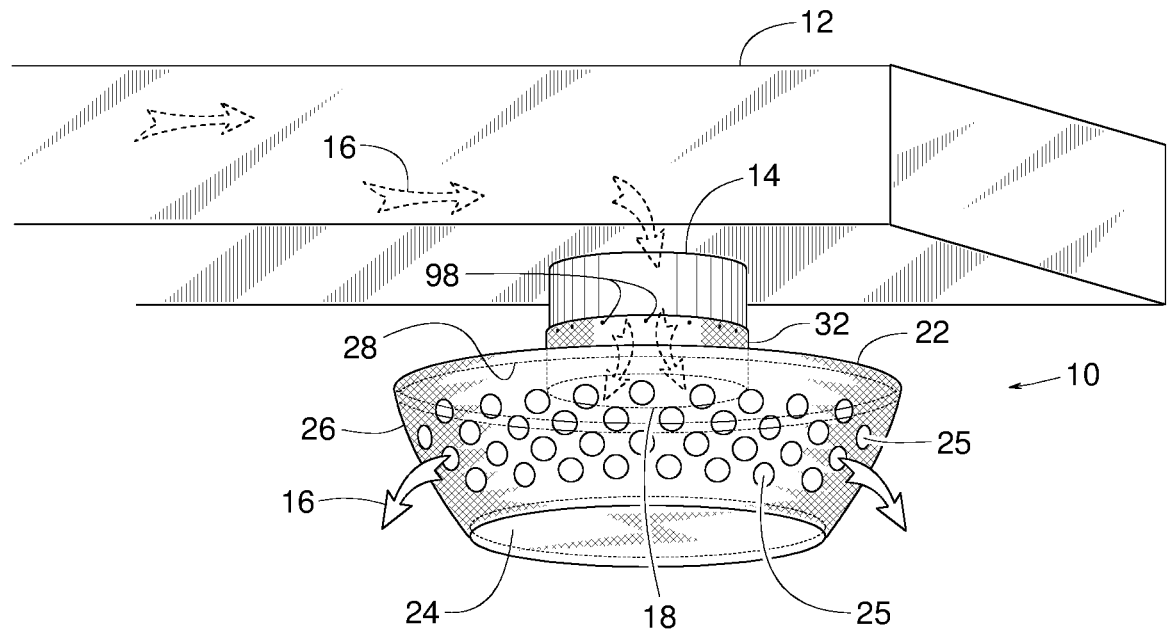
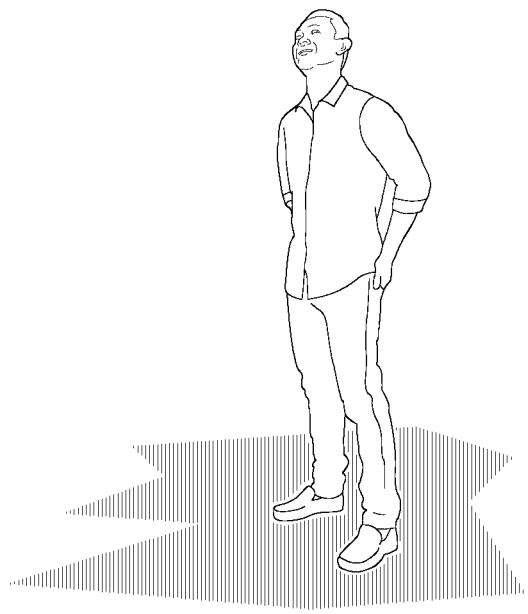

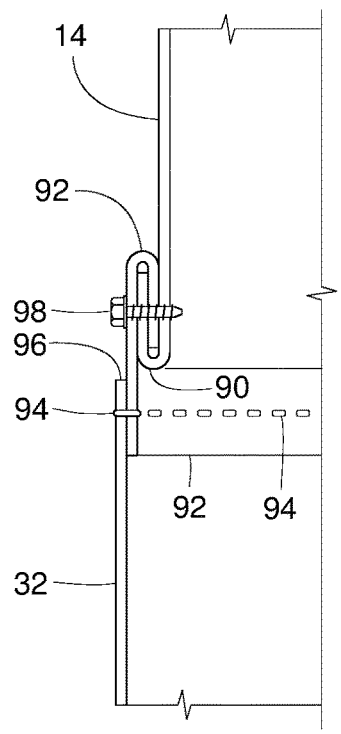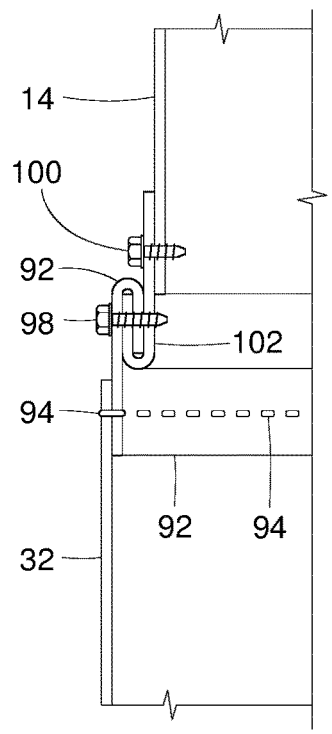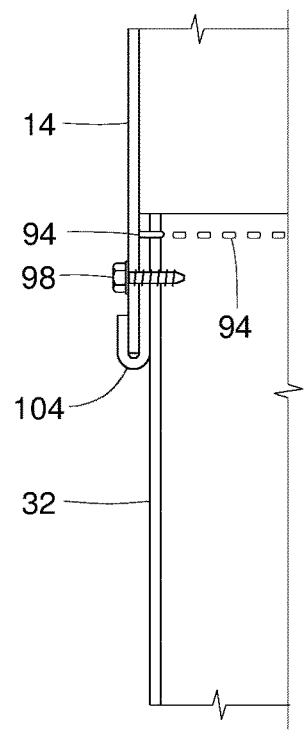

FABRIC DROP-DOWN DIFFUSERS

RELATED APPLICATIONS

This patent arises from a continuation of U.S. patent application Ser. No. 15/417,006 (now U.S. Pat. No. 11,231, 202), which was filed on Jan. 26, 2017, and which is incorporated herein by reference in its entirety. Priority to U.S. patent application Ser. No. 15/417,006 is claimed.

FIELD OF THE DISCLOSURE

This patent generally pertains to HVAC systems (heating ventilating and air-conditioning systems) and more specifically to fabric drop-down diffusers.

BACKGROUND

HVAC systems (heating ventilating and air-conditioning systems) typically include a blower that circulates conditioned air through one or more areas in a building. As used herein, the air entering the areas is referred to as, "supply air," and the leaving air is called, "return air." Some HVAC systems will heat, cool, dehumidify, humidify, filter and/or otherwise condition the air before one or more discharge outlets deliver the supply air to chosen areas of the building.

A drop-down diffuser is one example of such a discharge outlet. A drop-down diffuser usually comprises a rigid box-like structure mounted at an overhead location, usually near the ceiling of the building. A supply air duct typically feeds supply air down in through the top of the box-like structure, and peripheral openings in the diffuser release the supply air to the surrounding area.

Some drop-down diffusers have a sheet of porous fabric attached to the rigid box-like structure. The porous fabric helps in evenly dispersing the supply air into the areas being served by the HVAC system. One example of such a diffuser is disclosed in US Published Patent Application No. 2008/0176506 A1, which is specifically incorporated herein by reference in its entirety.

BRIEF DESCRIPTION OF THE DRAWINGS

FIG. 1 is a perspective view of an example drop-down diffuser constructed in accordance with the teachings disclosed herein.

FIG. 26 is an enlarged view of an example joint within an encircled area of FIG. 3.

FIG. 27 is a view similar to FIG. 26 but showing an alternate example joint constructed in accordance with the teachings disclosed herein.

FIG. 28 is a view similar to FIGS. 26 and 27 but showing another alternate example joint constructed in accordance with the teachings disclosed herein.

DETAILED DESCRIPTION

Example drop-down diffusers for HVAC systems (heating, ventilating and air conditioning systems) are comprised of non-porous and/or air-permeable fabric supported internally by one or more rigid hoops. In some examples, a drawstring tightens fabric panels over an upper and/or a lower hoop. In some examples, internal fabric baffles help direct airflow and muffle noise. Some example diffusers have various means for connecting to a sheet metal duct and various means for creating an internal conical air deflector. In some examples, the conical deflector is curved and its shape is adjustable.

Figure 2:
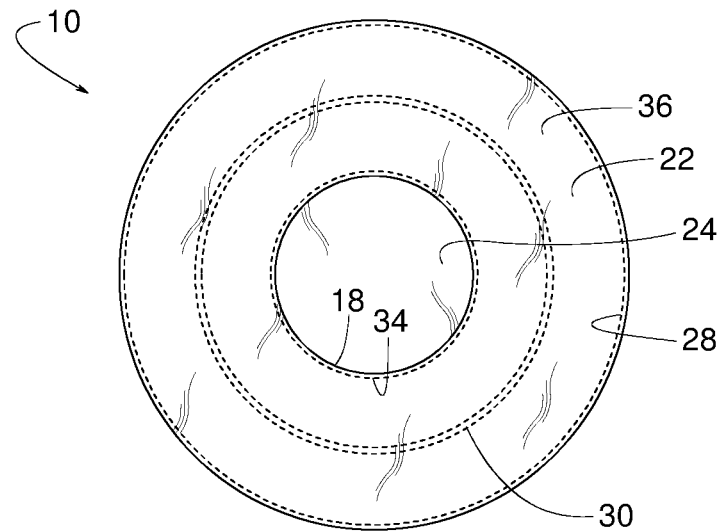
FIG. 2 is a top view of the example diffuser shown in FIG. 1.
Figure 3:
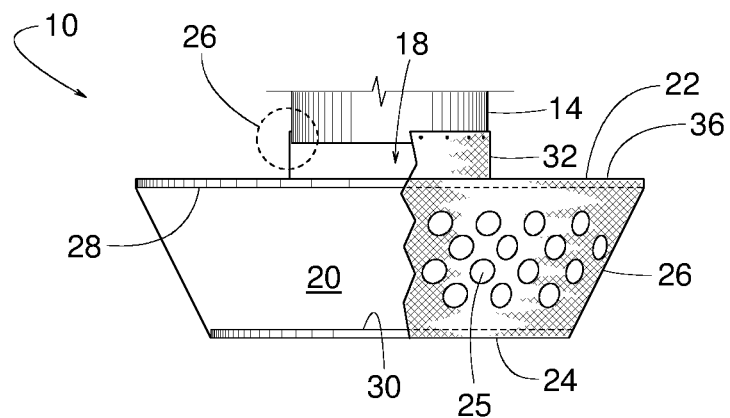
FIG. 3 is a front view of the example diffuser shown in FIG. 1, wherein a portion of the outer fabric is cut away to show the example diffuser's internal air chamber and one or more example hoops.

FIGS. 1-3 show various views of an example drop-down diffuser 10 mounted to an overhead supply air duct 12. In some examples, the supply air duct 12 is made of sheet metal and is in a generally rectangular shape. A cylindrical branch duct 14, also made of sheet metal, connects the supply air duct 12 to the diffuser 10. In other examples, the ducts 12, 14 are of other shapes and made of materials other than sheet metal. A blower or some other air-moving means forces air 16 in series flow through the supply air duct 12, down through the branch duct 14, through a supply air inlet 18 of the diffuser 10, and into an air chamber 20 of the diffuser 10. From the air chamber 20, the diffuser 10 disperses the air 16 into a room, area or other space surrounding the diffuser 10.

In some examples, the diffuser 10 is of a design that is lightweight, muffles airflow noise, muffles blower and/or other mechanical noises, evenly and/or strategically disperses air, reduces (e.g., minimizes) condensation on the surface of the diffuser, is machine washable, and is collapsible for compact packaging and shipping. In the example illustrated in FIGS. 1-3, the diffuser 10 comprises an upper panel 22, a lower panel 24, a circumferential fabric sheet 26, an upper hoop 28, a lower hoop 30, and a sleeve 32 connecting the upper panel 22 to the branch duct 14. In some examples, a central hoop 34 reinforces the area where the sleeve 32 connects to the upper panel 22. In the illustrated example, the upper panel 22 defines the supply air inlet 18, and the panels 22, 24 and the sheet 26 define the air chamber 20. As shown in the illustrated example, the lower hoop 30 is smaller than the upper hoop 28. As a result, the circumferential fabric sheet 26 is positioned at an angle to at least partially face downward, thereby facilitating the distribution of the air 16 into the space around and beneath the diffuser 10.

In the illustrated example, each of the upper panel 22, the lower panel 24, the sheet 26 and the sleeve 32 are made of a pliable fabric (e.g., polyester fabric, screen mesh, netting, etc.). Depending on the application, one or more areas of the fabric is air permeable either by a porous quality of the fabric itself and/or by a number of openings 25 cut into the fabric. In some examples, entire sections of the diffuser 10 are completely impervious to air. For instance, in some examples, the sleeve 32, the upper panel 22, and the lower panel 24 are impervious to air, while only the circumferential fabric sheet 26 is air permeable via the openings 25 and/or via porosity of the fabric itself. Examples of the diffuser 10 include all permeable/impermeable combinations of the upper panel 22, the lower panel 24, the sheet 26 and the sleeve 32.

To help prevent the diffuser 10 from sagging and to help prevent the diffuser's fabric from fluttering in turbulent air, some examples of the diffuser 10 include the upper hoop 28, the lower hoop 30 and/or the central hoop 34. The hoops 28, 30, 34 are relatively stiff compared to the fabric of the diffuser 10. Example hoop materials include metal, fiberglass, plastic, etc. In some examples, the upper hoop 28 holds an upper fabric sheet 36 of the upper panel 22 in radial tension, thus keeping the upper fabric sheet 36 generally taut.

Figure 4:
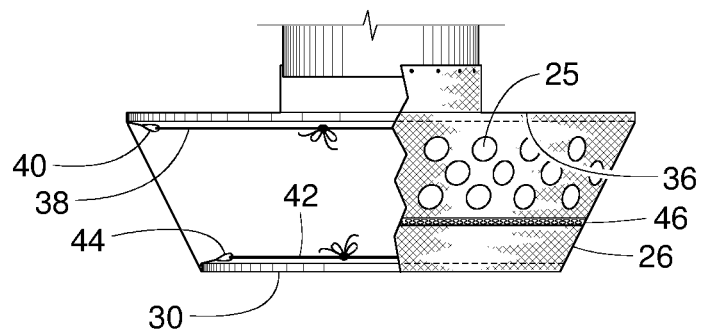
FIG. 4 is a front view similar to FIG. 3 but showing the addition of an example zipper and one or more example drawstrings.

To help hold upper hoop 28 in place and further hold the upper fabric sheet 36 of the upper panel 22 taut, some examples of the diffuser 10 include an upper drawstring 38, as shown in FIG. 4. The drawstring 38 extends through an upper loop of material 40 that runs circumferentially along a periphery of the upper panel 22 that is wrapped over the upper hoop 28. In some examples, the upper loop material 40 corresponds to a series of spaced apart loops distributed circumferentially along the periphery of the upper panel 22. Manually cinching the upper drawstring 38 exerts a constricting force that radially tightens the upper fabric sheet 36. In other examples, rather than wrapping around the upper hoop 28, the upper panel 22 includes one or more hooks attached thereto that extend circumferentially along the periphery of the upper panel 22 (e.g., extruded plastic hook(s) to latch on to the upper hoop 28. In such examples, cinching the drawstring 38 urges the hook(s) against the upper hoop 28 and exerts a radial tensile force across the upper panel 22 to keep the panel 22 taut.

Likewise, in some examples, the lower hoop 30 holds the lower panel 24 in radial tension. To increase the radial tension in the lower panel 24, some examples of diffuser 10 include a lower drawstring 42, as shown in FIG. 4. The lower drawstring 42 extends in a loop of material 44 that runs circumferentially along a periphery of the lower panel 24 that is wrapped over the lower hoop 30. In other examples, the lower drawstring 42 runs through a series of spaced apart loops distributed circumferentially along the periphery of the lower panel 22. Manually cinching the lower drawstring 42 exerts a constricting force that radially tightens the lower panel 24. The upper panel 22, the lower panel 24, and the circumferential fabric sheet 26 may be interconnected in any suitable manner such as, for example, via zippers, hook and loop fasteners, sewing, etc.

In the illustrated example, a zipper 46 (or comparable joint) provides means for manually accessing the drawstrings 38, 42. Although the zipper 46 is shown lying between and generally parallel to the hoops 28, 30, other examples of the diffuser 10 have the zipper 46 at any orientation and location on the diffuser 10. Example zipper locations include adjacent to the lower hoop 30, adjacent to the upper hoop 28, on the circumferential fabric sheet 26, on the upper panel 22, and on the lower panel 24. Thus, although the openings 25 are shown in the illustrated example as being above the zipper 46. in some examples, the openings 25 may be below the zipper 46. In other examples, there may be openings 25 both above and below the location of the zipper 46.

In some examples, the lower hoop 30 is suspended from the circumferential fabric sheet 26, which, in turn, is suspended from the upper hoop 28. That is, in some examples, the weight of the lower hoop 30 and/or the circumferential fabric sheet 26 is substantially supported by the upper hoop 28. In some examples, the weight of the lower hoop 28 keeps the circumferential fabric sheet 26 taut in a direction extending between the lower hoop 30 and the upper hoop 28.

Figure 5:
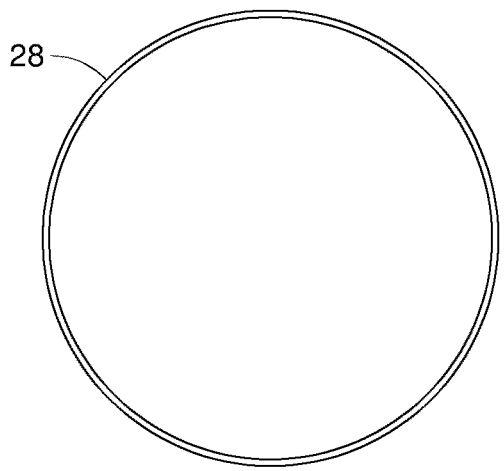
FIG. 5 is a top view of an example upper hoop constructed in accordance with the teachings disclosed herein.
Figure 6:
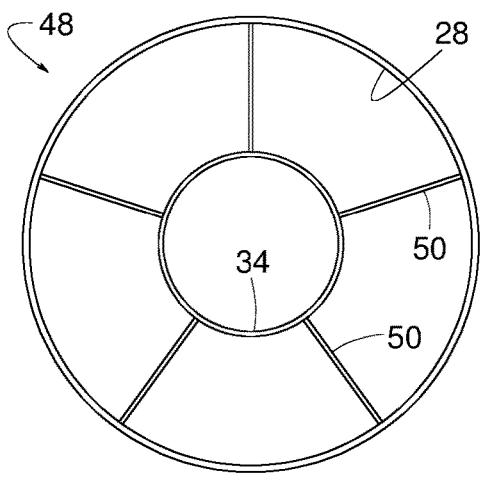
FIG. 6 is a top view of an example upper hoop, an example central hoop and example spokes constructed in accordance with the teachings disclosed herein.
Figure 7:
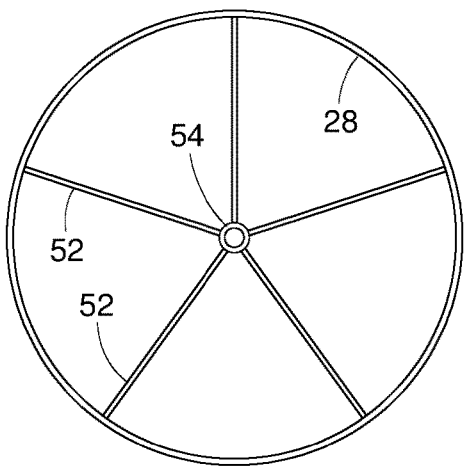
FIG. 7 is a top view of an example upper hoop, an example central hub and example spokes constructed in accordance with the teachings disclosed herein.
Figure 8:
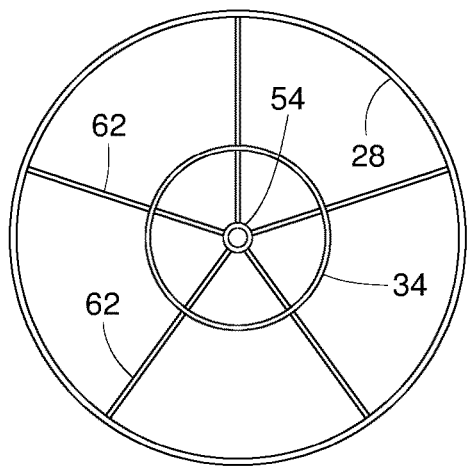
FIG. 8 is a top view of an example upper hoop, an example central hoop, example spokes and an example hub constructed in accordance with the teachings disclosed herein.

The hoops 28, 30, 34 can be of any imaginable shape and size. Some example hoop shapes include circular, rectangular, polygonal, and the shapes shown FIGS. 5-11. The illustrated example of FIG. 5 shows the upper hoop 28 as circular. FIG. 6 is an example hoop 48 comprising a plurality of spokes 50 connecting upper the hoop 28 to the central hoop 34. The illustrated example of FIG. 7 shows a plurality of spokes 52 extending radially between the upper hoop 28 and a hub 54. The hub 54 can be used for connecting to a vertically elongate compression member 56 (e.g., FIG. 22) or for providing an anchor point 58 from which to attach a vertically elongate tension member 60 (FIGS. 16, 17, 23 and 24). In other examples, the compression and tension members 56, 60 may be attached to a portion of one or more of the hoops 28, 30, 34 and/or one or more of the spokes 50. Examples of the vertically elongate compression member 56 include a rod, a shaft, a tube, a bar and/or any other member capable of carrying and transmitting compressive forces along its length. In some examples, the compressive forces arise due to vertical tension in the circumferential fabric sheet 26. In other words, the compression member 56 provides additional force beyond the weight of the lower hoop 30 to maintain the circumferential fabric sheet 26 taut between the upper and lower hoops 28, 30. Examples of the vertically elongate tension member 60 include a cord, a rope, a chain, a wire, a cable, a strap, and/or any other member capable of carrying and transmitting tensile forces along its length. The illustrated example of FIG. 8 shows a plurality of spokes 62 connecting the hub 54 and the central hoop 34 to the upper hoop 28. In some examples, the hoops 28, 30, 34 may include more than one hub to serve as different points of attachment for more than one compression member 56 and/or tension member 60. While the compression member 56 and the tension member 60 are shown and described in the illustrated examples as being vertically elongate, in some examples, the compression member 56 and/or the tension member 60 may be elongate in a non-vertical direction. For example, the compression member 56 and/or the tension member 60 may connect to the hoops 28, 30, 34, the spokes 50, and/or the hub 54 at an angle relative to the vertical direction.

Figure 9:
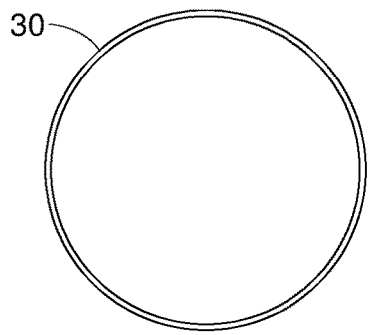
FIG. 9 is a top view of an example lower hoop constructed in accordance with the teachings disclosed herein.
Figure 10:
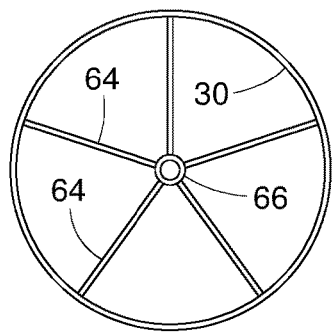
FIG. 10 is a top view of an example lower hoop, an example hub and example spokes constructed in accordance with the teachings disclosed herein.
Figure 11:
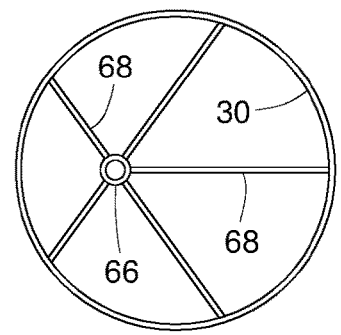
FIG. 11 is a top view of another example lower hoop, an example hub and example spokes constructed in accordance with the teachings disclosed herein.
Figure 22:
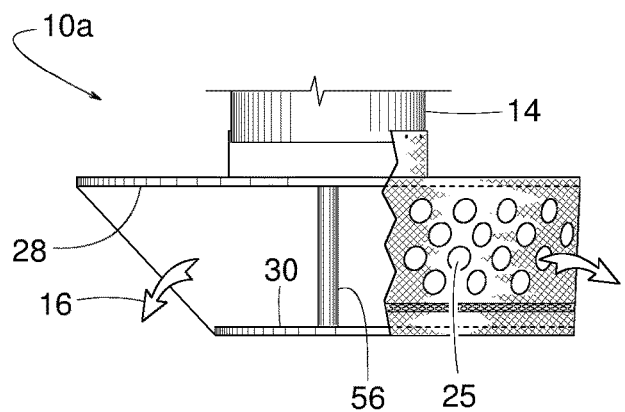
FIG. 22 is a front view similar to FIG. 4 but showing another example diffuser constructed in accordance with the teachings disclosed herein, wherein the example diffuser has a vertically elongate compression member that holds the example diffuser in a skewed configuration.

The illustrated example of FIG. 9 shows the lower hoop 30 as circular. The illustrated example of FIG. 10 shows a plurality of spokes 64 extending radially between the lower hoop 30 and a hub 66. In some examples, the elongate compression member 56 connects the hub 66 of FIG. 10 to the hub 54 of FIG. 8. The illustrated example of FIG. 11 shows an asymmetrical set of spokes 68 extending radially between the lower hoop 30 and the hub 66 to place the hub 66 at a radially offset position relative to the hoop 30. The hub's radially offset position in combination with the elongate compression member 56 connected to a radially centered hub 54 in the upper hoop 28 creates a skewed diffuser 10a, as shown in FIG. 22. The diffuser 10a of FIG. 22 is skewed in that the lower hoop 30 is not aligned or centered with the upper hoop 28. The misalignment of the upper and lower hoops 28, 30 results in the circumferential fabric sheet 26 having different angles (relative to a vertical direction) at different points around the diffuser 10. In some examples, at least one portion of the circumferential fabric sheet 26 is substantially vertical (e.g., the right-hand side of the diffuser 10a as illustrated in FIG. 22). The changes in the angle of the fabric sheet 26 also affect the shape or corresponding area of the sheet 26 facing away from the diffuser 10a in each direction. The changes in the shape, angle, and/or area of the circumferential sheet 26 may be used to control the direction and volume of the air 16 that is dispersed in each direction out of the diffuser 10.

Other examples of the diffuser 10 (e.g., diffusers 10b-i) are shown in FIGS. 12-25. In the example shown in FIGS. 12 and 13, the diffuser 10b includes a plurality of baffles 70 (e.g., five baffles). The baffles 70 help direct the air 16 through the diffuser 10b, and the baffles 70 can be of any quantity. Example baffle materials include fabric, metal, plastic, air permeable sheeting, and impermeable sheeting. In examples where the baffles 70 are made of fabric, the baffles 70 also help in muffling noise. In the example illustrated in FIG. 13, the baffles 70 extend up into the sleeve 32 for greater flow control and/or additional noise muffling.

Figure 12:
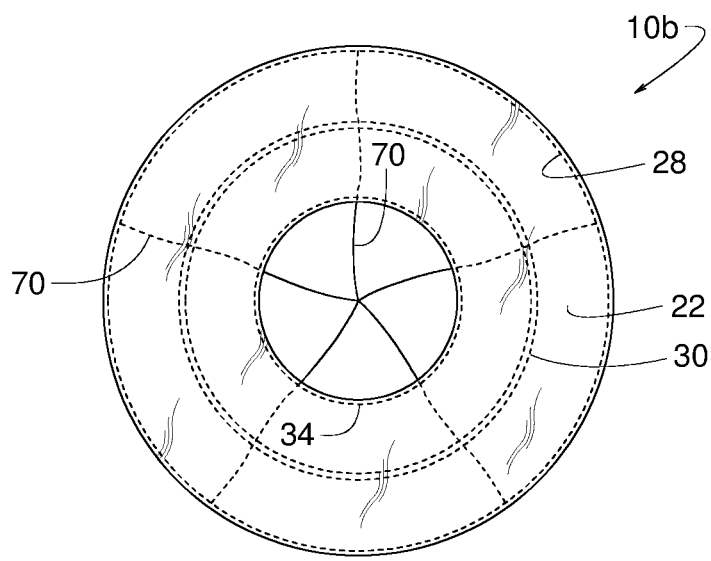
FIG. 12 is a top view similar to FIG. 2 but showing an example diffuser with a plurality of baffles, wherein the example diffuser is constructed in accordance with the teachings disclosed herein.
Figure 13:
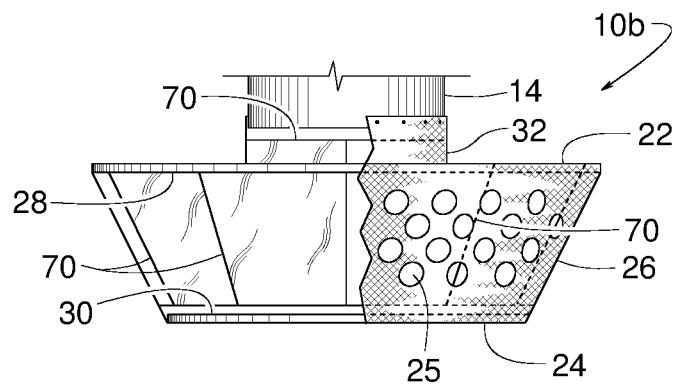
FIG. 13 is a front view of the example diffuser shown in FIG. 12, wherein a portion of the outer fabric is cut away to show the example diffuser's internal baffles.
Figure 14:
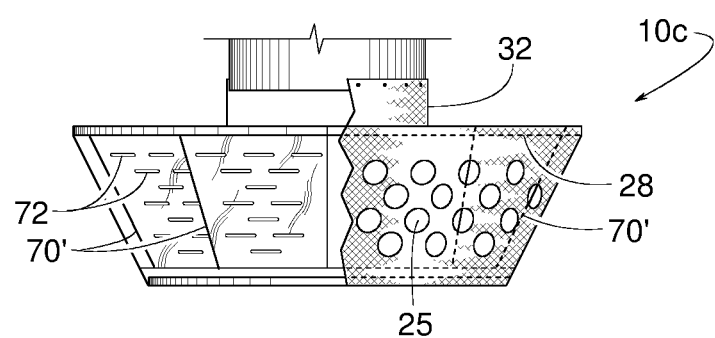
FIG. 14 is a front view similar to FIG. 13 but showing the example baffles having a plurality of openings.

The illustrated example of FIG. 14 shows the diffuser 10c, which is the same as the diffuser 10b of FIGS. 12 and 13 but with the addition of discrete air passage slits 72 in a lower profile baffle 70'. The baffles 70', being of a lower profile, do not extend up into the sleeve 32, thereby resulting in changes to the airflow characteristics through the diffuser 10c, which can be desirable in certain applications. The slits 72 (or comparable openings) also alter the airflow pattern. In some examples, the slits 72 shown in FIG. 14 may be implemented in conjunction with the higher profile baffles 70 shown in FIGS. 12 and 13. In some examples, the number and/or size of the slits 72 (or other openings) within the baffles 70 may differ on different ones of the baffles 70. In this manner, differences in airflow leaving the diffuser 10c at different points around its circumference may be established without changing an exterior appearance of the diffuser 10c. As a specific example, increases the quantity and/or size of slits within one side of the diffuser 10c would increase the airflow out that side of the diffuser 10c. Such an arrangement may be useful when the diffuser 10c is installed close to an exterior wall where it may be desirable to have greater airflow as compared to an interior region of the conditioned space surrounding the diffuser.

Figure 15:
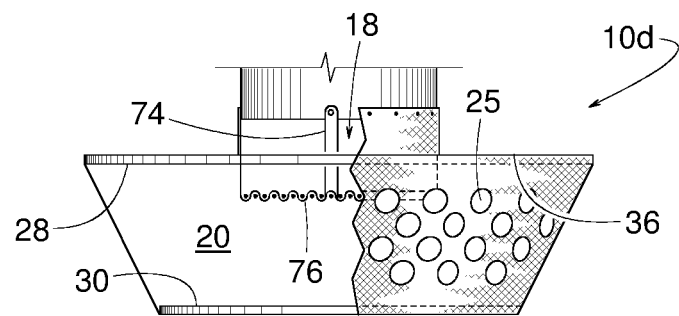
FIG. 15 is a front view similar to FIG. 3 but showing the example diffuser having an example internal screen.

The illustrated example of FIG. 15 shows the diffuser 10d with a bracket 74 suspending a screen 76 underneath the supply air inlet 18. The screen 76 may help distribute air 16 more evenly through air chamber 20. Example screen materials include wire screen, cloth mesh, fabric mesh, netting, and perforated sheet metal.

Figure 16:
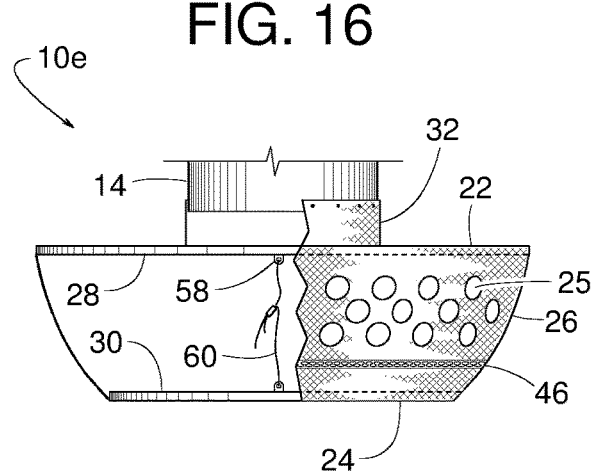
FIG. 16 is a front view similar to FIGS. 3 and 4 but showing an example diffuser with a vertically elongate tension member, wherein the example diffuser is constructed in accordance with the teachings disclosed herein.
Figure 17:
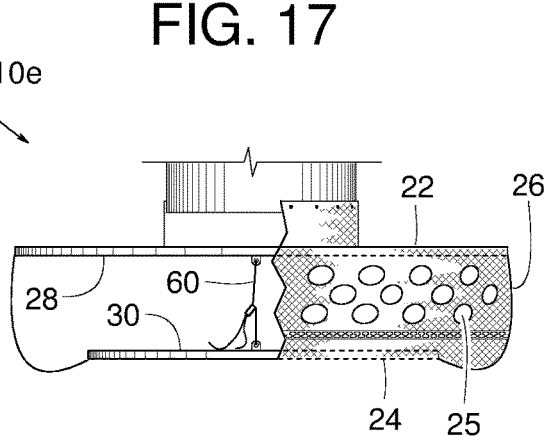
FIG. 17 is a front view similar to FIG. 16 but showing the example diffuser in another configuration.

The illustrated example of FIGS. 16 and 17 show the diffuser 10e with a suspension cord used as the elongate tension member 60. In some examples, an upper end of the tension member 60 connects to the upper hub 54 (FIGS. 7 and 8), and a lower end of the tension member 60 connects to the lower hub 66 (FIG. 10). In other examples, at least one of the tension member 60 connects to the spokes and/or the associated upper and lower hoops 28, 30. In some examples, both ends of the tension member 60 connect to the either the upper hoop 28 (and/or the associated hub and/or spokes) or the lower hoop 30 (and/or the associated hub and/or spokes) with a central region of the tension member 60 looping around the other one of the upper hoop 28, the lower hoop 30, and/or the associated hub and/or spokes, Further, while the tension member 60 is shown extending in the vertical direction, in some examples, the tension member (or portions thereof) may be angled relative to the vertical direction. In some examples, there may be more than one tension member 60. In some examples, manually adjusting the length of the tension member 60 adjusts the vertical separation between the hoops 28, 30. The illustrated example of FIG. 17, as compared to FIG. 16, shows the resulting change in the diffuser's shape upon shortening the length of tension member 60. Such a change in shape alters the diffuser's appearance and airflow characteristics, which may be desirable in certain applications. In some examples, the diffuser 10e includes more than one elongate tension member 60. In some examples, the one or more tension member 60 serves to assist in maintaining the lower panel 24 substantially parallel to the upper panel 22. In other examples, the tension member 60 may maintain the lower panel 24 in a position angularly offset relative to the upper panel 22.

Figure 18:
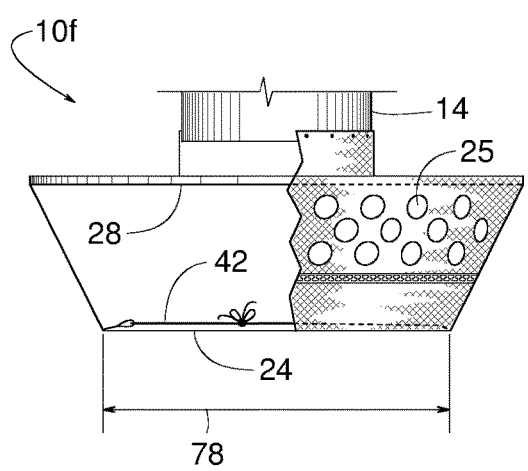
FIG. 18 is a front view similar to FIG. 4 but showing another example diffuser constructed in accordance with the teachings disclosed herein, wherein the example diffuser has a lower drawstring.
Figure 19:
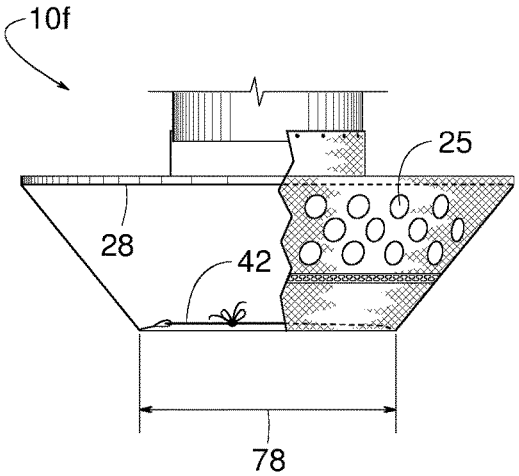
FIG. 19 is a front view similar to FIG. 18 but showing the example drawstring tighter.

The illustrated example of FIGS. 18 and 19 show the diffuser 10f, which is similar to the example shown in FIG. 4 but with the lower hoop 30 omitted. Without the lower hoop 30 keeping the lower panel 24 taut, tightening the drawstring 42 provides a means for adjusting the lower panel's diameter 78, and thus provides a means for adjusting the pattern and/or volume of air 16 discharging from diffuser 10f. FIG. 19, as compared to FIG. 18, shows the resulting change in the lower panel's diameter 78 upon tightening the drawstring 42. In some such examples, the lower panel 24 includes a metal split ring spring that expands or contracts in diameter in accordance with the tightening and loosening of the drawstring 42. In some examples, the lower panel 24 is made of an elastic material to stretch or contract with associated changes in the diameter of the panel 24. In other examples, the lower panel 24 may be non-elastic and may bunch together as the diameter is decreased.

Figure 20:
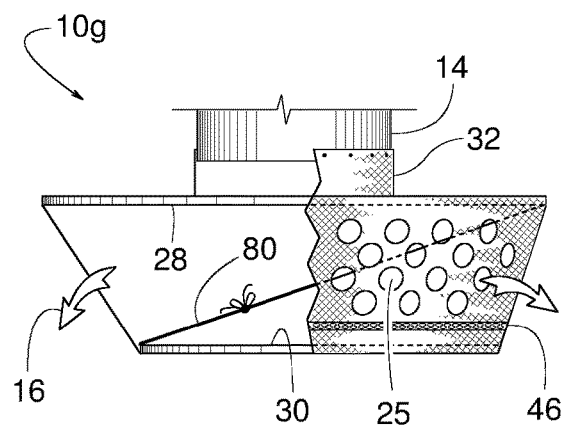
FIG. 20 is a front view similar to FIG. 4 but showing another example diffuser constructed in accordance with the teachings disclosed herein, wherein the example diffuser has a diagonal drawstring.
Figure 21:
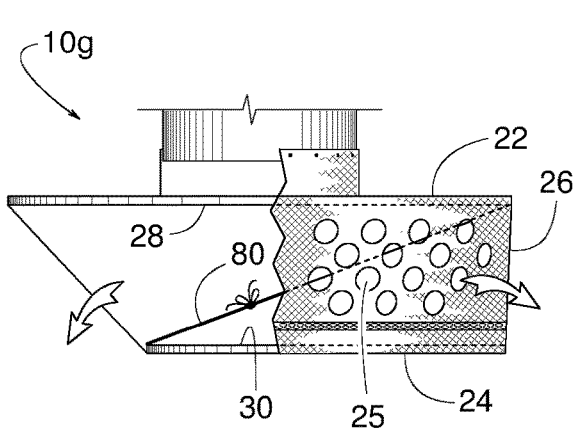
FIG. 21 is a front view similar to FIG. 20 but showing the example drawstring tighter.

The illustrated example of FIGS. 20 and 21 show diffuser 10g, which is similar to the example shown in FIGS. 1-3 but with the addition of a tension member 80 (e.g., cord, rope, chain, wire, cable, strap, etc.) extending diagonally between the upper and lower hoops 28, 30. Varying the length of the tension member 80 adjusts the amount of skew or lateral offset of the lower hoop 30 relative to the upper hoop 28. The illustrated example of FIGS. 20 and 21 show the change in skew of the diffuser 10g as a result of tightening tension member 80. In some examples, the diffuser 10g includes more than one tension member 80, each of which may be adjusted to the same or different tightness as other tension members and have the same or different angle as other tension members, thereby enabling control of the shape (e.g., skew) of the diffuser 10g. Such a change in shape alters the diffuser's appearance and airflow characteristics, which may be desirable in certain applications.

Figure 23:
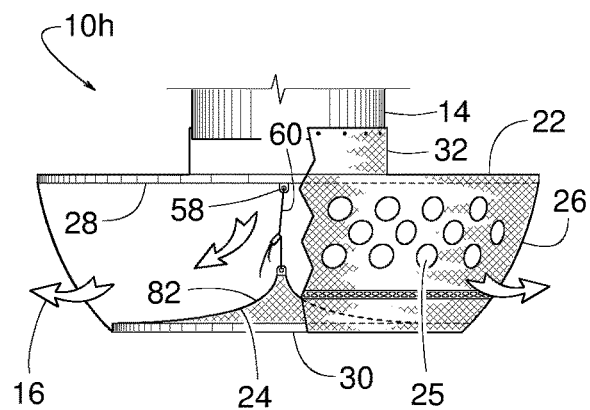
FIG. 23 is a front view similar to FIG. 4 but showing another example diffuser constructed in accordance with the teachings disclosed herein, wherein the example diffuser has a vertical elongate tension member that forces the example diffuser's lower panel into the shape of a curved cone.
Figure 24:
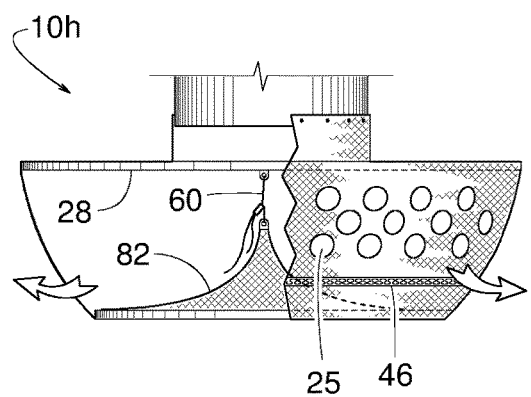
FIG. 24 is a front view similar to FIG. 23 but showing the example vertically elongate tension member tighter.

The illustrated example of FIGS. 23 and 24 shows the diffuser 10h, which uses the elongate tension member 60 that pulls on a central point of the lower panel 24 to create a curved cone 82 to direct the air 16 within the chamber 20 of the diffuser 10h in a more radial outward direction. FIG. 24, as compared to FIG. 23, shows the curved cone's change in shape as a result of tightening the tension member 60. In some examples, the lower panel 24 is air permeable. In other examples, the lower panel 24 is impervious to air.

Figure 25:
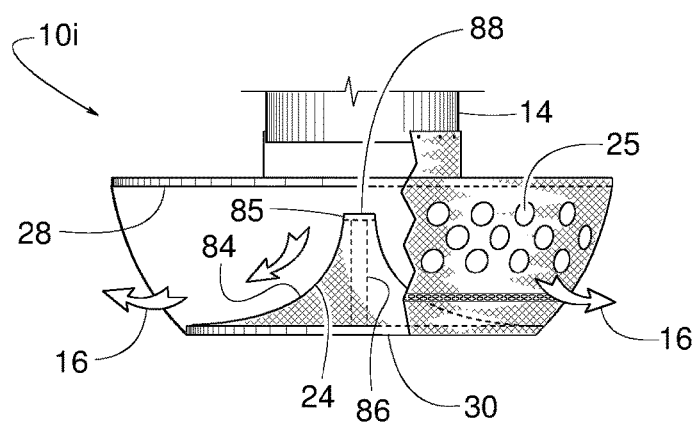
FIG. 25 is a front view similar to FIG. 4 but showing another example diffuser constructed in accordance with the teachings disclosed herein, wherein the example diffuser has a vertical elongate compression member that forces the example diffuser's lower panel into the shape of a curved cone.

A similar curved cone 84 can be created as shown in the illustrated example diffuser 10i of FIG. 25. In this example, the lower end of an elongate compression member 86 (e.g., tube, rod, bar, etc.) is attached to the lower hoop's central hub 66 (e.g., the hub 66 of FIG. 10) and extends upward to push up and elevate a central portion 88 of the lower panel 24. In the illustrated example, a disk 85 with a diameter larger than the compression member 86 helps distribute the pressure that the compression member 86 exerts upward against lower panel 24. In some examples, the disk 85 also helps deflect the incoming supply air 16 radially outward. In some examples, the length of the compression member 86 is manually adjustable. For example, the compression member 86 may include telescopic tubes that can be adjusted and fixed in place via spring push-buttons that extend through holes in the tubes.

FIGS. 26-28 show various example means for connecting the fabric sleeve 32 to the sheet metal branch duct 14. In the example shown in FIG. 26, the duct 14 has an integral sheet metal channel 90 around its outer periphery. A mating plastic adaptor 92 is sewn (see thread 94) or otherwise attached to an upper edge 96 of the fabric sleeve 32. Although the adaptor 92 can be made of almost any material, some examples of the adaptor 92 are made of TPV (thermoplastic vulcanizate), as this material can be readily sewn by conventional means. In the illustrated example, a first plurality of self-tapping screws 98 fasten the adaptor 92 to the duct 14 while the thread 94 fastens the adaptor 92 to the sleeve 32.

In the example shown in FIG. 27, a second plurality of screws 100 fasten a separate channel 102 to the duct 14, which is an alternative to the duct 14 having the integral channel 90. Then, similar to the example shown in FIG. 26, the plastic adaptor 92 and the first plurality of screws 98 connect the sleeve 32 to the channel 102. In the example shown in FIG. 28, a channel 104 is sewn or otherwise attached to the sleeve 32, and the screws 98 fasten the sleeve 32 and the channel 104 to the duct 14.

In some examples, the concept of using one or more tension members 60 for adjusting the outer shape of a diffuser (FIGS. 16, 17, 23 and 24) is applied to adjusting the shape of a diffuser's internal baffle assembly, as shown in FIGS. 29-36. In the example shown in FIGS. 29 and 30, a diffuser 10j includes the circumferential fabric sheet 26 surrounding an internal fabric baffle 106. In the illustrated example, the internal fabric baffle 106 has a generally circular upper edge 108 zipped or otherwise attached to the sleeve 32 and/or to the upper panel 22 along the circumference or periphery of the supply air inlet 18. The internal baffle 106, in some examples, is a fabric mesh that allows the air 16 to pass through it. In the illustrated example, the lower end of the tension member 60 is attached to a circular base 110 connected to the internal baffle 106. Examples of circular base 110 include a hoop, a metal screen disc, a fabric mesh, and a disc impervious to air. The upper edge 108 and the base 110 can be of any shape and is not necessarily circular.

Figure 29:
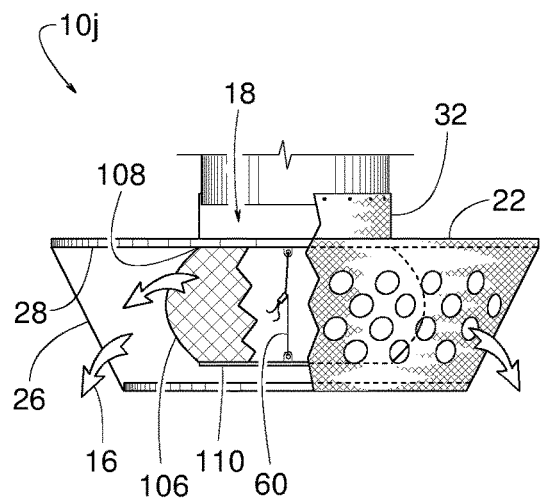
FIG. 29 is a front view similar to FIG. 3 but showing another example diffuser constructed in accordance with the teaching disclosed herein, wherein portions of the outer fabric and an example inner baffle are cut away to show internal features of the example diffuser.
Figure 30:
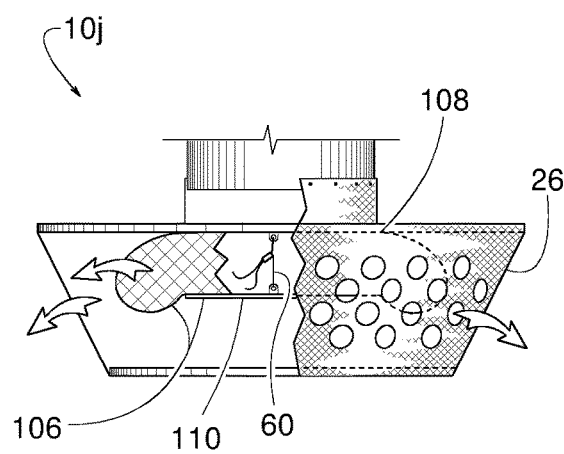
FIG. 30 is a front view similar to FIG. 29 but showing the example diffuser in another configuration.

Manually adjusting the length of tension member 60 adjusts the vertical separation between the upper hoop 28 and the base 110. The illustrated example of FIG. 30, as compared to FIG. 29, shows the resulting change in the shape of the internal baffle assembly upon shortening the length of the tension member 60. Such a change in the shape of the internal baffle assembly may alter the airflow characteristics of the diffuser 10j and does so generally without altering the diffuser's outer appearance, which may be desirable in certain applications.

Figure 31:
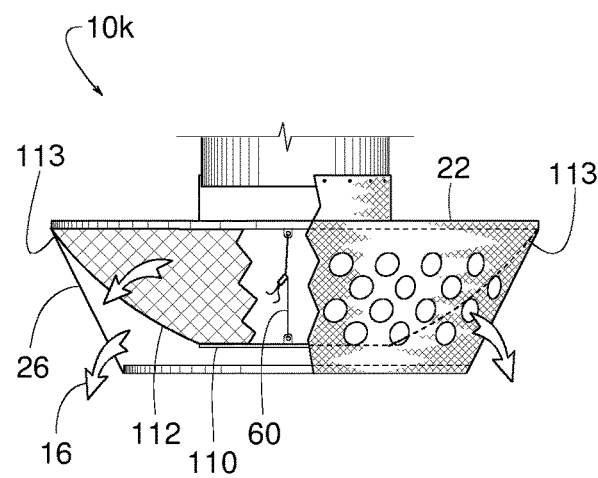
FIG. 31 is a front view similar to FIG. 29 but showing another example diffuser constructed in accordance with the teachings disclosed herein.
Figure 32:
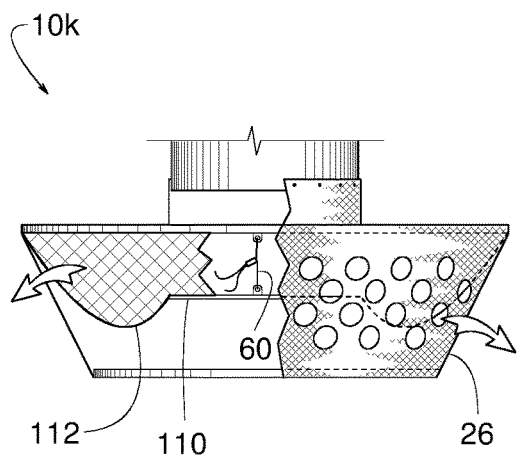
FIG. 32 is a front view similar to FIG. 31 but showing the example diffuser in another configuration.

In the example shown in FIGS. 31 and 32, a diffuser 10k includes the circumferential fabric sheet 26 surrounding an internal fabric baffle 112. In the illustrated example, the internal fabric baffle 112 has a generally circular upper edge 113 zipped or otherwise attached to the outer periphery of upper panel 22. The internal baffle 112, in some examples, is a fabric mesh that allows the air 16 to pass through it. In the illustrated example, the lower end of the tension member 60 is attached to the base 110.

Manually adjusting the length of the tension member 60 adjusts the vertical separation between the upper panel 22 and the base 110. The illustrated example of FIG. 32, as compared to FIG. 31, shows the resulting change in the shape of the internal fabric baffle 112 upon shortening the length of the tension member 60. Such a change in shape may alter the airflow characteristics of the diffuser 10k and does so generally without altering the diffuser's outer appearance, which may be desirable in certain applications.

Figure 33:
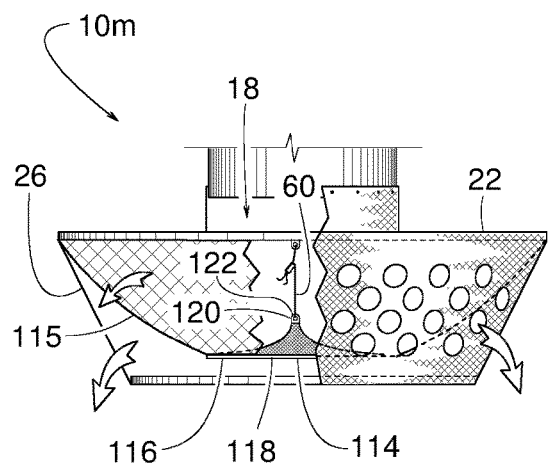
FIG. 33 is a front view similar to FIGS. 29 and 31 but showing another example diffuser constructed in accordance with the teachings disclosed herein.
Figure 34:
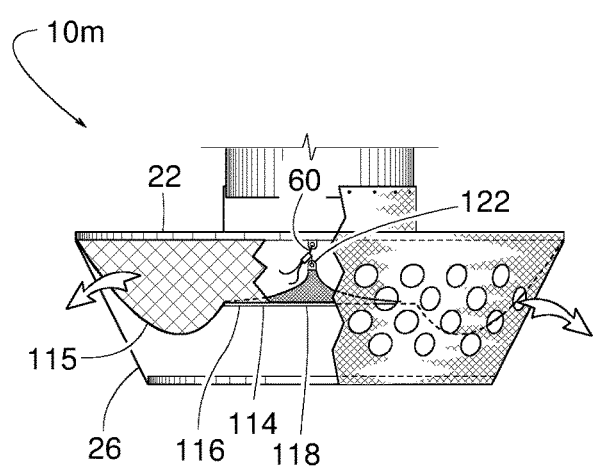
FIG. 34 is a front view similar to FIG. 33 but showing the example diffuser in another configuration.

A diffuser 10m, shown in the illustrated example of FIGS. 33 and 34, is similar to diffuser 10k of FIGS. 31 and 32; however, an internal fabric baffle 115 of the diffuser 10m comprises a base 114 with a hoop 116 supporting a fabric disc 118 (porous or nonporous fabric). Tension in the elongate member 60 pulls on a central point 120 of fabric disc 118 to create a curved conical shape with an apex 122 pointing toward the supply air inlet 18. The curved conical shape of the fabric disc 118 provides an air-guiding function similar to that of the curved cone 82 of FIGS. 23 and 24.

Manually adjusting the length of the tension member 60 adjusts the vertical separation between the upper panel 22 and the base 114. The illustrated example of FIG. 34, as compared to FIG. 33, shows the resulting change in the shape of the internal fabric baffle 115 upon shortening the length of the tension member 60. Such a change in the internal baffle's shape may alter the airflow characteristics of diffuser 10m and does so generally without altering the diffuser's outer appearance, which may be desirable in certain applications.

Figure 35:
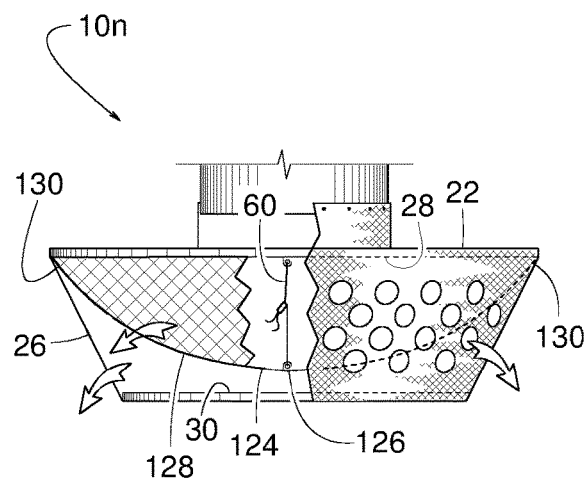
FIG. 35 is a front view similar to FIGS. 29, 31 and 33 but showing another example diffuser constructed in accordance with the teachings disclosed herein.
Figure 36:
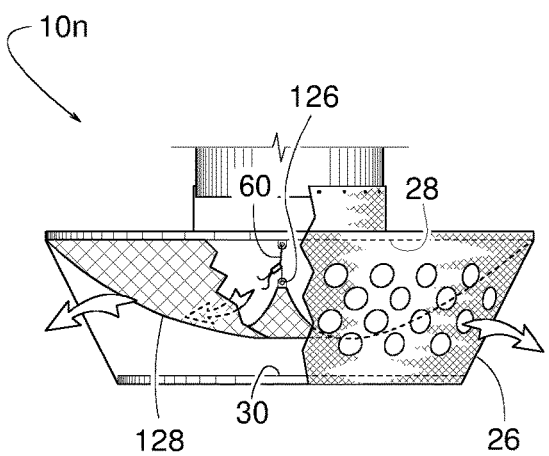
FIG. 36 is a front view similar to FIG. 35 but showing the example diffuser in another configuration.

A diffuser 10n, shown in the illustrated example of FIGS. 35 and 36, is similar to the diffuser 10m; however, a base 124 of the diffuser 10n has no hoop 116 for supporting the fabric disc 118. Instead, the elongate member 60 pulls on a central point 126 of an air-permeable internal fabric baffle 128. An upper outer periphery 130 of the internal baffle 128 is zipped or is otherwise attached to the outer periphery of the upper panel 22. Tension in the elongate member 60 pulls on the central point 126 of the internal baffle 128 to create a curved conical shape. The curved conical shape of the internal baffle 128 provides an air-guiding function similar to that of the curved cone 82 of FIGS. 23 and 24.

Manually adjusting the length of the tension member 60 adjusts the vertical separation between the upper panel 22 and the central point 126. The illustrated example of FIG. 36, as compared to FIG. 35, shows the resulting change in the shape of the internal baffle 128 upon shortening the length of the tension member 60. Such a change in the internal baffle's shape may alter the airflow characteristics of diffuser 10n and does so generally without altering the diffuser's outer appearance, which may be desirable in certain applications. In each of the examples shown in FIGS. 29-36, the internal fabric baffle 106, 112, 115, 128 is adjustable selectively to a plurality of positions by simply adjusting the length of the elongate member 60.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A drop-down diffuser comprising:
a hoop to be supported adjacent an end of an air duct;
a first fabric sheet to hang downward from the hoop, the first fabric sheet to define a first wall of an air chamber adjacent the hoop on a side of the hoop opposite the air duct, the first fabric sheet to completely surround the air chamber along a circumferential path corresponding to the hoop, the hoop to be transverse to the air duct and positioned so that air delivered by the air duct is to pass through the hoop and into the air chamber; and
a second fabric sheet to be coupled to the first fabric sheet, the second fabric sheet to define a second wall of the air chamber.

2. The drop-down diffuser of claim 1, wherein the second fabric sheet extends across the hoop, the second fabric sheet including an opening through which the air delivered by the air duct is to pass.

3. The drop-down diffuser of claim 2, wherein the second fabric sheet is closer to the air duct than the hoop is to the air duct.

4. The drop-down diffuser of claim 2, further including a third fabric sheet to be coupled to the first fabric sheet, the third fabric sheet to define a third wall of the air chamber, the third fabric sheet spaced apart from the hoop, the first fabric sheet to extend between the hoop and the third fabric sheet.

5. The drop-down diffuser of claim 4, wherein the second fabric sheet has a first diameter, and the third fabric sheet has a second diameter, the first diameter larger than the second diameter.

6. The drop-down diffuser of claim 1, wherein the second fabric sheet is spaced apart from the hoop, the first fabric sheet to extend between the hoop and the second fabric sheet.

7. The drop-down diffuser of claim 6, wherein the second fabric sheet is circular, a diameter of the second fabric sheet being smaller than a diameter of the hoop.

8. The drop-down diffuser of claim 6, further including a third fabric sheet to be coupled to the first fabric sheet, the third fabric sheet to define a third wall of the air chamber opposite the second wall of the air chamber.

9. The drop-down diffuser of claim 1, wherein the hoop is a first hoop, the drop-down diffuser further including a second hoop spaced apart from the first hoop, the first fabric sheet to be coupled to a perimeter of each of the first and second hoops.

10. The drop-down diffuser of claim 1, wherein the hoop is a first hoop, the drop-down diffuser further including a second hoop spaced apart from the first hoop, the first fabric sheet to extend between the first hoop and the second hoop.

11. The drop-down diffuser of claim 10, wherein the first fabric sheet is to be coupled to a perimeter of each of the first and second hoops.

12. The drop-down diffuser of claim 10, wherein the first hoop is larger than the second hoop.

13. The drop-down diffuser of claim 10, further including an elongate member extending through the air chamber between the first and second hoops.

14. The drop-down diffuser of claim 13, wherein the elongate member is to be in compression.

15. The drop-down diffuser of claim 13, wherein the elongate member is to be in tension.

16. A drop-down diffuser comprising:
a first wall defined by a first circular perimeter, the first wall to be planar, the first wall having an opening for a supply air inlet;

a second wall defined by a second circular perimeter, the first wall to be spaced apart from and face the second wall with an air chamber defined therebetween; and a third wall to extend between the first and second walls, the third wall to be curved to extend around the air chamber along the first and second circular perimeters associated with the first and second walls, the third wall corresponding to a pliable fabric sheet.

17. The drop-down diffuser of claim 16, wherein at least one of the first wall or the second wall includes a pliable fabric sheet.

18. The drop-down diffuser of claim 16, further including a hoop associated with the first wall, the hoop to define the first circular perimeter.

19. The drop-down diffuser of claim 16, further including a hoop associated with the second wall, the hoop to define the second circular perimeter.

20. A drop-down diffuser comprising:

a first hoop having a first diameter;

a supply inlet adjacent a center of the first hoop, the supply inlet to enable air from an air duct to pass through the first hoop;

a second hoop having a second diameter, the second diameter smaller than the first diameter, the second hoop spaced apart from the first hoop; and a fabric sheet to extend between the first and second hoops, the fabric sheet to be coupled to the first hoop along a first perimeter of the first hoop, the fabric sheet to be coupled to the second hoop along a second perimeter of the second hoop, both the second hoop and the fabric sheet to be suspended from the first hoop.

* * * * *